(12) United States Patent
Bury et al.

(10) Patent No.: US 7,972,435 B2
(45) Date of Patent: *Jul. 5, 2011

(54) AMINE CONTAINING STRENGTH IMPROVEMENT ADMIXTURE

(75) Inventors: Jeffrey R Bury, Macedonia, OH (US); Thomas M Vickers, Jr., Concord Township, OH (US); Bruce J Christensen, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,358

(22) Filed: Jun. 2, 2009

(65) Prior Publication Data

US 2009/0292041 A1 Nov. 26, 2009

Related U.S. Application Data

(62) Division of application No. 11/066,930, filed on Feb. 25, 2005, now Pat. No. 7,556,684.

(51) Int. Cl.
*C04B 24/04* (2006.01)
*C04B 24/12* (2006.01)
(52) U.S. Cl. ......... 106/724; 106/727; 106/728; 106/823
(58) Field of Classification Search .................. 106/724, 106/727, 823, 728
See application file for complete search history.

(56) References Cited

U.S. PATENT DOCUMENTS

| | | | |
|---|---|---|---|
| 4,401,472 A * | 8/1983 | Gerber | 106/727 |
| 4,519,842 A * | 5/1985 | Gerber | 106/727 |
| 4,943,323 A | 7/1990 | Gartner et al. | |
| 4,990,190 A | 2/1991 | Myers et al. | |
| 5,084,103 A | 1/1992 | Myers et al. | |
| 5,158,996 A | 10/1992 | Valenti | |
| 5,162,402 A | 11/1992 | Ogawa et al. | |
| 5,203,919 A | 4/1993 | Bobrowski et al. | |
| 5,358,566 A | 10/1994 | Tanaka et al. | |
| 5,393,343 A | 2/1995 | Darwin et al. | |
| 5,427,617 A | 6/1995 | Bobrowski et al. | |
| 5,494,516 A | 2/1996 | Drs et al. | |
| 5,583,183 A | 12/1996 | Darwin et al. | |
| 5,591,259 A | 1/1997 | Huang et al. | |
| 5,609,681 A | 3/1997 | Drs et al. | |
| 5,612,396 A | 3/1997 | Valenti et al. | |
| 5,629,048 A | 5/1997 | Kinney | |
| 5,633,298 A | 5/1997 | Arfaei et al. | |
| 5,643,978 A | 7/1997 | Darwin et al. | |
| 5,660,626 A | 8/1997 | Ohta et al. | |
| 5,661,206 A | 8/1997 | Tanaka et al. | |
| 5,665,158 A | 9/1997 | Darwin et al. | |
| 5,668,195 A | 9/1997 | Leikauf | |
| 5,674,929 A | 10/1997 | Melbye | |
| 5,703,174 A | 12/1997 | Arfaei et al. | |
| 5,725,657 A | 3/1998 | Darwin et al. | |
| 5,728,207 A | 3/1998 | Arfaei et al. | |
| 5,786,425 A | 7/1998 | Sperling et al. | |
| 5,792,252 A | 8/1998 | Sprouts | |
| 5,840,114 A | 11/1998 | Jeknavorian et al. | |
| 5,895,525 A | 4/1999 | Huang et al. | |
| 5,912,284 A | 6/1999 | Hirata et al. | |
| 5,922,124 A | 7/1999 | Supplee | |
| 6,008,275 A | 12/1999 | Moreau et al. | |
| 6,063,184 A | 5/2000 | Leikauf et al. | |
| 6,136,088 A | 10/2000 | Farrington | |
| 6,136,950 A | 10/2000 | Vickers, Jr. et al. | |
| 6,187,841 B1 | 2/2001 | Tanaka et al. | |
| 6,267,814 B1 | 7/2001 | Bury et al. | |
| 6,284,867 B1 | 9/2001 | Vickers, Jr. et al. | |
| 6,290,770 B1 * | 9/2001 | Moreau et al. | 106/708 |
| 6,310,143 B1 | 10/2001 | Vickers, Jr. et al. | |
| 6,391,106 B2 | 5/2002 | Moreau et al. | |
| 6,767,399 B2 | 7/2004 | Peev et al. | |
| 6,800,129 B2 * | 10/2004 | Jardine et al. | 106/724 |
| 6,858,074 B2 * | 2/2005 | Anderson et al. | 106/724 |
| 2002/0005148 A1 * | 1/2002 | Moreau et al. | 106/728 |
| 2003/0127026 A1 * | 7/2003 | Anderson et al. | 106/724 |
| 2004/0149172 A1 * | 8/2004 | Jardine et al. | 106/724 |
| 2004/0149174 A1 * | 8/2004 | Farrington et al. | 106/802 |
| 2004/0198873 A1 * | 10/2004 | Bury et al. | 524/5 |

FOREIGN PATENT DOCUMENTS

WO WO 00/77058 A1 12/2000

OTHER PUBLICATIONS

Tom Pyle, Robert S. Sugar, Abstract—"Rapid Strength Portland Cement Concrete" California Department of Transportation, Materials Engineering and Testing Services, Caltrans/Paving Association, Concrete Paving Conference, Dec. 2001.
Tom Pyle, "Fast-Setting Concrete Evaluated in California" Apr. 2002 Better Roads.
Jim Anderson, "Paving Repair Finds a Four-Hour Champion" Dec. 2001 Concrete Construction.
Ed Rice, Four vs. Two Hours, Feb. 2002, Concrete Construction.
ACI Committee 325 Technical Document 325-11R-01 "Accelerated Techniques for Concrete Paving".

* cited by examiner

*Primary Examiner* — Paul Marcantoni
(74) *Attorney, Agent, or Firm* — Curatolo Sidoti Co., LPA; Salvatore A. Sidoti; D. Ari Sherwin

(57) ABSTRACT

A strength improvement admixture composition is provided that increases the compressive strength of cementitious compositions without negatively increasing the setting time. The admixture comprises the components of a polycarboxylate dispersant and strength improvement additive.

18 Claims, No Drawings

US 7,972,435 B2

AMINE CONTAINING STRENGTH IMPROVEMENT ADMIXTURE

CROSS REFERENCE TO RELATED APPLICATIONS

This application is a divisional of U.S. Ser. No. 11/066,930, filed on Feb. 25, 2005, which is hereby incorporated by reference.

BACKGROUND

Dispersants have been used in the construction industry, either singularly or as part of water-reducing compositions, to disperse cementitious mixtures allowing for a reduction in mix water content while maintaining flowability and workability of the mixture. This reduction in the water cement ratio leads to increases in compressive strength and is one of the main reasons that water-reducing admixtures are used. Compounds such as sulfonated melamine formaldehyde condensate (SMF), sulfonated naphthalene formaldehyde condensate (BNS), and lignosulfonates are commonly used as dispersants. However, these compounds are best suited for specific tasks. BNS and SMF are particularly difficult to use reliably and cost effectively at low levels and are best suited for use as high-range water reducers (greater than 12% water-reduction). Lignosulfonates in general tend to be best suited for lower water-reduction levels (less than 15%) and can cause excessive set retardation when used at higher amounts. Other materials such as salts of hydroxycarboxylic acids and sugars such as glucose or sucrose can also provide some degree of water reduction. In addition to the water reduction, the hydroxycarboxylic acids and sugars have commonly been used to retard the rate of set, which can lead to further improvements in compressive strength.

Dispersants such as BNS or lignosulfonates are often combined with additional components like sugars to achieve improved strength performance. These compositions usually must also contain accelerating components to offset excessive retardation. Even in combination with accelerating type components, formulated water reducers such as these can still retard excessively when used across a wide water reduction range in concrete mixtures containing pozzolans such as fly ash or slag, or in concrete that is mixed and placed at cool temperatures (50° F. or below). Additional accelerating admixtures are sometimes needed in an effort to offset this excessive retardation and depending on the severity, can be minimally effective. Excessive retardation is undesirable in that it can delay jobsite activity, prevent forms from being stripped, delay finishing operations or lead to low early age strengths. Providing an admixture with full range (Type A to F) water reducing capability and improved compressive strength while maintaining normal setting or easily controllable setting characteristics is desirable.

One improvement in the prior art was to use polycarboxylate dispersants over the conventional dispersants such as BNS and SMF. Polycarboxylate dispersants are structured with a polymeric backbone, such as a carbon chain backbone, with pendant moieties that provide the dispersing capabilities of the molecule. For example, polyacrylic acid has carboxylic groups attached to the backbone. Additionally, side chain moieties such as polyoxyalkylenes can be attached to the carboxylic groups to provide further dispersing capabilities. These polymers attach to the cement grains and produce dispersion by means of both electrostatic repulsion and steric hindrance, resulting in increased fluidity.

It is desirable to provide an admixture comprising a polycarboxylate dispersant that improves the compressive strength of cementitious compositions without exponentially increasing the set time, as is observed with BNS and lignosulfonate dispersants. Therefore, an admixture which improves the compressive strength of the hardened cementitious composition without producing any other changes would be advantageous in the industry.

U.S. Pat. No. 4,401,472 to Gerber discloses an additive comprising a poly(hydroxyalkylated) polyethyleneamine or a poly(hydroxyalkylated)polyethyleneimine or mixtures thereof, wherein the additive is present in a hydraulic cement mix in an amount sufficient to increase the compressive strength of the hardened mix.

U.S. Pat. No. 4,519,842 to Gerber discloses a cement mix comprising an admixture of poly(hydroxyalkylated) polyamine, alkoxylated poly(hydroxyalkylated)polyamine hydroxyalkylated derivatives of the compounds hydrazine, 1, 2, diaminopropane and polyglycoldiamine and mixtures thereof, wherein the admixture is present in amounts sufficient to increase the compressive strength of the hardened cement mix.

SUMMARY

A strength improvement admixture composition is provided which improves the compressive strength of cementitious compositions without negatively effecting the setting time and comprises the components of polycarboxylate dispersant and strength enhancing additive selected from the group consisting of poly(hydroxyalkylated)polyethyleneimines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl)amines, and mixtures thereof.

DETAILED DESCRIPTION

A strength improvement admixture composition for cementitious compositions is provided, as well as a novel cementitious composition containing such an admixture composition and a method for preparing such a cementitious composition.

Polycarboxylate dispersants are very effective at dispersing and reducing the water content in hydraulic cementitious compositions. These dispersants operate by binding to a cement particle and developing both electrostatic and steric repulsive forces, thereby keeping the particles apart, resulting in a more fluid system.

The term polycarboxylate dispersant used throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Pat. Nos. 6,267,814, 6,290, 770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference.

In certain embodiments the admixture composition comprises about 1% to about 99.99% polycarboxylate dispersant based on the total dry weight of the admixture composition components. In other embodiments the admixture composition comprises about 40% to about 95% polycarboxylate dispersant based on the total dry weight of the admixture composition components. In certain embodiments a cementitious composition comprises about 0.002% to about 2% polycarboxylate dispersant by weight of cementitious binder. In a further embodiment a cementitious composition comprises about 0.02% to about 0.4% polycarboxylate dispersant by weight of cementitious binder.

The polycarboxylate dispersants used in the system can be at least one of the dispersant formulas a) through j):

a) a dispersant of Formula (I):

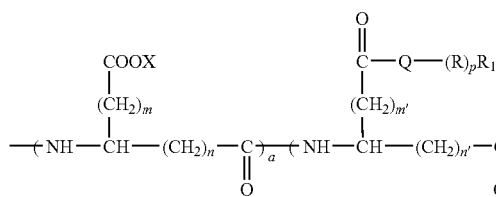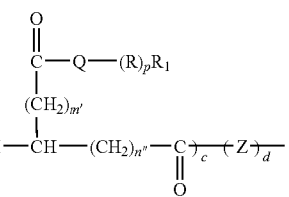

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

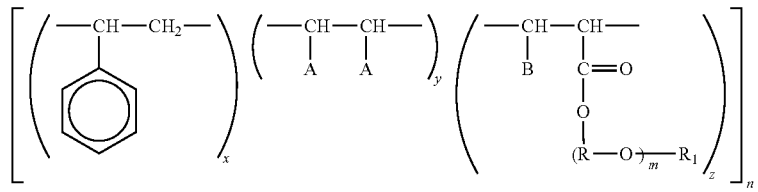

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
$R_1$ is a $C_{1-20}$ alkyl, $C_{6-9}$ cycloalkyl, or phenyl group;
x, y, and z are a number from 0.01 to 100;
m is a number from 1 to 100; and
n is a number from 10 to 100;

c) a dispersant comprising at least one polymer or a salt thereof having the form of a copolymer of
 i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
 ii) a monomer having the formula $CH_2$=$CHCH_2$—$(OA)_n$ OR, wherein n is an integer from 1-90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 2 to 95% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

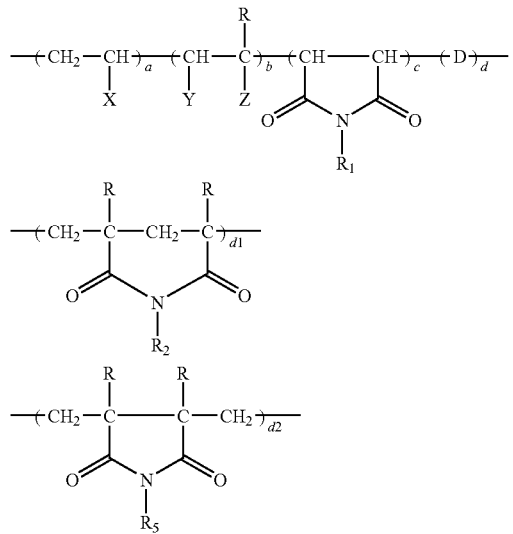

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —COO $(CHR_4)_nOH$ where n=2 to 6, or —$O(CH_2)_nOR_4$ wherein n=2 to 6;

$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;
b=about 0.2 to about 1.0;
c=0 to about 0.5;
d=0 to about 0.5;

wherein a, b, c, and d represent the mole fraction of each unit and the sum of a, b, c, and d is 1.0;

wherein a can represent 2 or more differing units in the same dispersant structure;

wherein b can represent 2 or more differing units in the same dispersant structure;

wherein c can represent 2 or more differing units in the same dispersant structure; and wherein d can represent 2 or more differing units in the same dispersant structure;

g) a dispersant of Formula (IV):

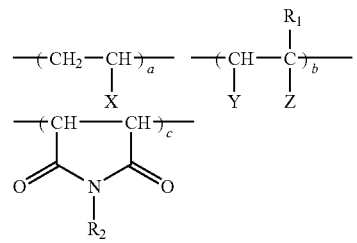

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —$O(CH_2)_nOR_3$ where n=2 to 6, —$COOR_3$, —$(CH_2)_nOR_3$ where n=0 to 6, or —$CONHR_3$;

$R_1$=H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;
b=0.2-0.99;
c=0-0.5;

wherein a, b, c represent the mole fraction of each unit and the sum of a, b, and c, is 1;

wherein a can represent 2 or more differing units in the same dispersant structure;

wherein b can represent 2 or more differing units in the same dispersant structure; and wherein c can represent 2 or more differing units in the same dispersant structure;

h) a random copolymer corresponding to the following Formula (V) in free acid or salt form having the following monomer units and numbers of monomer units:

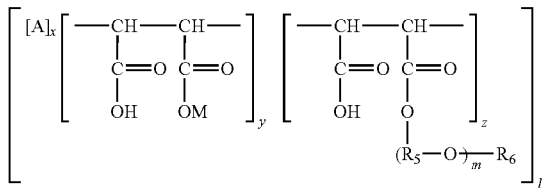

wherein A is selected from the moieties (i) or (ii)

(i) —$CR_1R_2$—$CR_3R_4$— wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated mono and/or dicarboxylic acids, comprising:

i) 0 to 90 mol % of at least one component of the formula 3a or 3b:

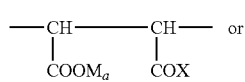

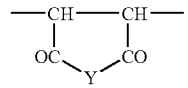

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR^2$, —$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

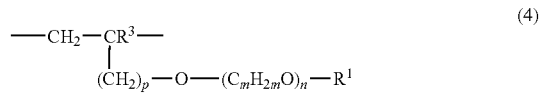

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is independently 2 to 4, and n is 0 to 100, and iii) 0 to 10 mol % of at least one component of the formula 5a or 5b:

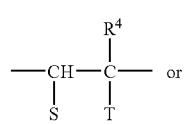

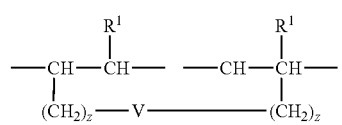

wherein S is a hydrogen atom or —$COOM_a$ or —$COOR_5$, T is —$COOR_5$, —W—$R_7$, —CO—[—NH—$(CH_2)_3$-]$_s$ —W—$R_7$, —CO—O—$(CH_2)_z$—W—$R_7$, a radical of the general formula:

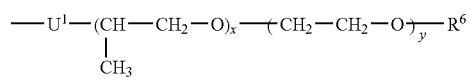

or —$(CH_2)_z$—V—$(CH_2)_z$—CH=CH—$R_1$, or when S is —$COOR_5$ or —$COOM_a$, $U_1$ is —CO—NHM-, —O— or —$CH_2$O, $U_2$ is —NH—CO—, —O— or —$OCH_2$, V is —O—CO—$C_6H_4$—CO—O— or —W—, and W is

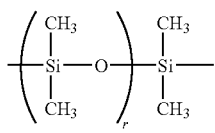

$R_4$ is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6 = R_1$ or

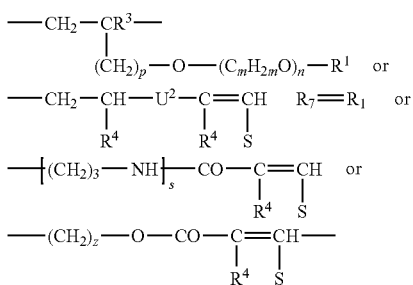

r is 2 to 100, s is 1 or 2, x is 1 to 150, y is 0 to 15 and z is 0 to 4;

iv) 0 to 90 mol % of at least one component of the formula 6a, 6b, or 6c:

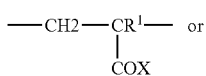

(6a)

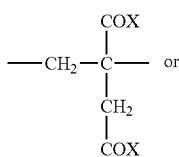

(6b)

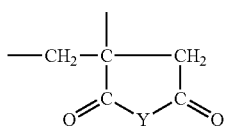

(6c)

wherein M is a hydrogen atom, a mono- or divalent metal cation, an ammonium ion or an organic amine residue, a is 1, or when M is a divalent metal cation a is ½;

wherein X is $-OM_a$,
- $-O-(C_mH_{2m}O)_n-R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
- $-NH-(C_mH_{2m}O)_n-R^1$,
- $-NHR_2$, $-N(R^2)_2$ or mixtures thereof in which $R^2 = R^1$ or $-CO-NH_2$; and wherein Y is an oxygen atom or $-NR^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

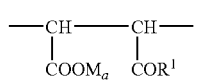

(7a)

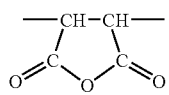

(7b)

wherein M is H, a monovalent metal cation, a divalent metal cation, an ammonium ion or an organic amine;

a is ½ when M is a divalent metal cation or 1 when M is a monovalent metal cation;

wherein $R^1$ is $-OM_a$, or
- $-O-(C_mH_{2m}O)_n-R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

m is 2 to 4;
n is 1 to 200;

ii) 0.5 to 80 mol. % of the structural units of formula 8:

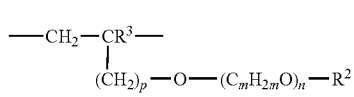

(8)

wherein $R^3$ is H or a $C_{1-5}$ aliphatic hydrocarbon;
p is 0 to 3;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;
m is 2 to 4;
n is 1 to 200;

iii) 0.5 to 80 mol. % structural units selected from the group consisting of formula 9a and formula 9b:

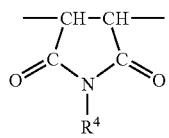

(9a)

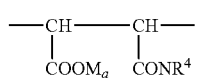

(9b)

wherein $R^4$ is H, $C_{1-20}$ aliphatic hydrocarbon that is optionally substituted with at least one hydroxyl group, $-(C_mH_{2m}O)_n-R^2$, $-CO-NH-R^2$, $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

iv) 1 to 90 mol. % of structural units of formula 10

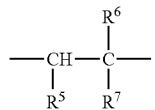
(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of —COOM$_a$, —(SO$_3$)M$_a$, and —(PO$_3$)M$_{a2}$, a $C_{5-8}$ cycloaliphatic hydrocarbon, —OCOR$^4$, —OR$^4$, and —COOR$^4$, wherein R$^4$ is H, a $C_{1-20}$ aliphatic hydrocarbon that is optionally substituted with at least one —OH, —(C$_m$H$_{2m}$O)$_n$—R$^2$, —CO—NH—R$^2$, $C_{5-8}$ cycloaliphatic hydrocarbon, or a $C_{6-14}$ aryl residue that is optionally substituted with a member selected from the group consisting of —COOM$_a$, —(SO$_3$)M$_a$, and —(PO$_3$)M$_{a2}$.

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The substituents in the optionally substituted aryl radical of formula (i), containing 6 to 14 carbon atoms, may be hydroxyl, carboxyl, $C_{1-14}$ alkyl, or sulfonate groups.

The substituents in the substituted benzene may be hydroxyl, carboxyl, $C_{1-14}$ alkyl, or sulfonate groups.

The strength enhancing additive is added to hydraulic cement mixes, such as portland cement concretes, grouts and mortars, high alumina cement concretes, grouts and mortars, and dry mixes for making such concretes, grouts and mortars in amounts sufficient to increase the compressive strength of the hydraulic cement mix. The additive is selected from the group consisting of poly(hydroxyalkylated)polyethyleneamines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl)amine and mixtures thereof. In certain embodiments the admixture composition comprises about 0.01% to about 99% strength improvement additive based on the total dry weight of the admixture composition components. In other embodiments the admixture composition comprises about 5% to about 60% strength improvement additive based on the total dry weight of the admixture composition components. In another embodiment a cementitious composition comprises about 0.0001% to about 0.2 strength improvement additive by weight of cementitious binder. In a further embodiment a cementitious composition comprises about 0.004% to about 0.08% strength improvement additive by weight of cementitious binder.

Illustrative examples of the strength improvement additive include, but are not limited to, N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N"-penta(hydroxyethyl)diethylenetriamine, N,N'-bis(2-hydroxypropyl)-N,N,N'-tri(hydroxyethyl)diethylenetriamine, poly(hydroxyethyl)polyethyleneimine, di(hydroxyethyl) 1,2-diaminopropane, tetra(hydroxyethyl) 1,2-diaminopropane, di(hydroxyethyl) hydrazine, tetra(hydroxyethyl)hydrazine, ethoxylated polyglycoldiamine, triisopropanolamine and mixtures thereof.

The poly(hydroxyalkylated)polyethyleneamine can have the following formula:

wherein x is 1,2 or 3 and R is selected from the group consisting of hydrogen, 2-hydroxyethyl, and 2-hydroxypropyl, each R can be the same or different, and at least 40% of the R groups are hydroxyalkyl, with no more than 40% of the R groups being hydroxypropyl.

The poly(hydroxyalkylated)polyamines can have the following formula:

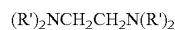

wherein R' is (CH$_2$CH$_2$O)$_y$H, (CH$_2$CH(CH$_3$)O)$_y$H, and/or —(CH(CH$_3$)CH$_2$O)$_y$H wherein y is 0, 1 or 2, and each R$^1$ can be the same or different.

The derivatives of hydrazine, 1,2-diaminopropane and polyglycoldiamine can have the following formula:

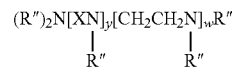

wherein R" can be the same or different and is selected from the group consisting of (CH$_2$CH$_2$O)$_y$H, CH$_2$CH(CH$_3$)O)$_y$H and (CH(CH$_3$)CH$_2$O)$_y$H wherein X is a covalent bond or a divalent organic radical selected from the group consisting of CH$_2$, CH$_2$CH$_2$,

and CH$_2$CH$_2$CH$_2$OCH$_2$CH$_2$OCH$_2$CH$_2$OCH$_2$CH$_2$CH$_2$;

wherein y and v are 0, 1 or 2;

wherein w is 0 or 1;

wherein v and w cannot both be 0.

The poly(hydroxyalkyl)amines can have the following formula:

Where R$^3$ is [(CHR$^4$)$_m$ (CHR$^4$)O]$_p$H where R$^4$ is independently H or CH$_3$ where m=1 or 2 where n=2 or 3 where p=1 or 2 where q=3-n and each R$^3$ can be the same or different for example, all hydroxypropyl, or mixed hydroxyethyl and hydroxypropyl.

An ethoxylated amine commercially available from Union Carbide Corporation under the trademark Ethoxylated Amine HH which when ethoxylated yields a typical analysis of:

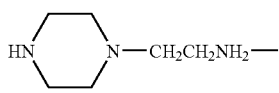

aminoethyl piperazine: 50% to 70% by weight
triethylene tetramine: 40% maximum by weight
others: balance.

The amounts of the components of the strength improvement admixture composition, polycarboxylate high range water reducing dispersant and strength improvement additive, may be governed by factors such as cement type and reactivity, ambient temperature, and concrete mixture proportions.

The hydraulic cement comprising the cementitious formulation is selected from the group consisting of portland cement, modified portland cement, or masonry cement, and mixtures thereof. By portland cement is meant all cementitious compositions which have a high content of tricalcium silicate and includes portland cement and cements that are chemically similar or analogous to portland cement, the specification for which is set forth in ASTM specification C 150-00.

Cementitious materials are materials that alone have hydraulic cementing properties, and set and harden in the presence of water. Included in cementitious materials are ground granulated blast-furnace slag, natural cement, hydraulic hydrated lime, and combinations of these and other materials.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof.

The cementitious composition described herein may contain other additives or ingredients and should not be limited to the stated formulations. Cement additives that may be added include, but are not limited to: retarders, accelerators, air-entraining or air detraining agents, corrosion inhibitors, pigments, dampproofing admixtures, gas formers, permeability reducers, pumping aids, fungicidal admixtures, germicidal admixtures, insecticidal admixtures, fibers, alkali-reactivity reducer, bonding admixtures, shrinkage reducing admixtures, pigment and any other admixture or additive that does not adversely affect the properties of the admixture of the present invention.

Set retarding, or also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Lignosulfonates, hydroxylated carboxylic acids, polysaccharides, borax, gluconic, tartaric and other organic acids and their corresponding salts, phosphonates, certain carbohydrates such as sugars and sugar-acids and mixtures thereof can be used as retarding admixtures.

An accelerator that can be used in the admixture of the present invention can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (such as calcium formate); a halide salt of an alkali metal or alkaline earth metal (such as bromide), Examples of accelerators particularly suitable for use in the present invention include, but are not limited to, POZZOLITH® NC534, nonchloride type accelerator and/or RHEOCRETE® CNI calcium nitrite-based corrosion inhibitor both sold under the trademarks by Degussa Admixtures, Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from synthetic or natural resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition.

Examples of air entrainers that can be utilized in the present invention include, but are not limited to MB AE 90, MB VR and MICRO AIR®, all available from Degussa Admixturs, Inc. of Cleveland, Ohio.

Air detrainers are used to decrease the air content in the cementitious composition. Examples of air detrainers that can be utilized in the present invention include, but are not limited to tributyl phosphate, dibutyl phthalate, octyl alcohol, water-insoluble esters of carbonic and boric acid, acetylenic diols, ethylene oxide-propylene oxide block copolymers and silicones.

Corrosion inhibitors in concrete serve to protect embedded reinforcing steel from corrosion. The high alkaline nature of the concrete causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. Compositions that may be used to inhibit corrosion are calcium nitrite, sodium nitrite, sodium benzoate, certain phosphates or fluorosilicates, fluoroaluminates, organic based water repelling agents, and related chemicals.

Dampproofing admixtures reduce the permeability of concrete that has low cement contents, high water-cement ratios, or a deficiency of fines in the aggregate portion. These admixtures retard moisture penetration into dry concrete and include certain soaps, stearates, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials that may be used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. Combinations that may be used for these purposes are polyhalogenated phenols, dialdrin emulsions, and copper compounds.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties in certain embodiments. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Fly ash is defined in ASTM C618.

Pozzolans can reduce the alkali-aggregate reaction and limit the disruptive expansion forces that this reaction can produce in hardened concrete.

In the construction field, many methods of protecting concrete from tensile stresses and subsequent cracking have been developed through the years. One modern method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present invention can include but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® shrinkage reducing agent is preferred and is available from Degussa Admixtures, Inc. of Cleveland, Ohio.

Natural and synthetic pigment admixtures are used to color concrete for aesthetic and safety reasons. These coloring admixtures are usually composed of pigments and include carbon black, iron oxide, phthalocyanine, umber, chromium oxide, titanium oxide and cobalt blue.

Examples of strength improvement admixture compositions were tested for the effect of their addition on the compressive strength and setting time of concrete mixtures.

Tables 1-5 show the effect of strength improvement admixture compositions in cementitious mixtures which comprise polycarboxylate dispersant and strength enhancing additive. Concrete mixture proportions for the examples were determined according to the guidelines outlined in ACI 211.1-91, Standard Practice for Selecting Proportions for Normal Weight Concrete. The mix design was based on a nominal cement content of 517 lb/yd$^3$ using a Type I portland cement. Tests for slump (ASTM C 143), air content (ASTM C 231), compressive strength (ASTM C 39) and time of set (ASTM C 403) were performed in accordance with ASTM procedures.

Table 1 shows the comparison of two different strength improvement additives, a tetrahydroxyethylethylenediamine and triisopropanolamine in combination with a polycarboxylate dispersant. For all of the concrete mixtures in the table, the polycarboxylate dispersant level was held constant at 0.2% by cement weight, and tributyl phosphate was added at 0.008% so that air contents would be less than 2%.

TABLE 1

|  | Sample | | | | | | |
| --- | --- | --- | --- | --- | --- | --- | --- |
|  | S-1 | S-2 | S-3 | S-4 | S-5 | S-6 | S-7 |
| Cement (lbs/yd$^3$) | 600 | 598 | 598 | 598 | 598 | 599 | 598 |
| Water (lbs/yd$^3$) | 267 | 266 | 266 | 266 | 266 | 267 | 266 |
| Sand (lbs/yd$^3$) | 1353 | 1350 | 1350 | 1349 | 1350 | 1352 | 1350 |
| Stone (lbs/yd$^3$) | 1909 | 1905 | 1905 | 1903 | 1905 | 1907 | 1905 |
| Water/Cement | 0.45 | 0.44 | 0.44 | 0.44 | 0.44 | 0.45 | 0.44 |
| Sand/Aggregate | 0.43 | 0.43 | 0.43 | 0.43 | 0.43 | 0.43 | 0.43 |
| PC Disp (% cwt) | 0.20 | 0.20 | 0.20 | 0.20 | 0.20 | 0.20 | 0.20 |

TABLE 1-continued

| | Sample | | | | | | |
|---|---|---|---|---|---|---|---|
| | S-1 | S-2 | S-3 | S-4 | S-5 | S-6 | S-7 |
| Tetrahydroxyethylethylenediamine (% cwt) | — | 0.02 | 0.05 | 0.08 | — | — | — |
| Triisopropanol amine (% cwt) | — | — | — | — | 0.02 | 0.05 | 0.08 |
| TBP (% cwt) | 0.008 | 0.008 | 0.008 | 0.008 | 0.008 | 0.008 | 0.008 |
| Slump (in) | 8.00 | 6.00 | 8.00 | 7.75 | 8.50 | 8.00 | 7.50 |
| % Air | 1.6 | 1.8 | 1.8 | 1.9 | 1.8 | 1.7 | 1.8 |
| Initial Set (Hrs.) | 5.7 | 5.7 | 5.4 | 5.5 | 5.4 | 5.6 | 5.4 |
| Final Set (Hrs.) | 7.4 | 7.6 | 6.8 | 7.3 | 7.1 | 7.2 | 6.7 |
| Compressive Strengths (psi) | | | | | | | |
| 1 day | 2760 | 3010 | 3580 | 3590 | 3690 | 3390 | 3690 |
| 7 day | 5860 | 6170 | 7120 | 7470 | 7110 | 7230 | 7750 |
| 28 day | 7740 | 8200 | 9080 | 9220 | 9400 | 9460 | 9870 |

PC Disp—polycarboxylate dispersant
TBP—tributyl phosphate

Table 1 shows that the samples containing polycarboxylate dispersant plus triisopropanolamine (S-5 to S-7) or polycarboxylate dispersant plus tetrahydroxyethylethylenediamine (S-2 to S-4) had increased compressive strengths over the sample containing polycarboxylate dispersant alone without any significant change in set time.

Table 2 shows the comparison of two different strength improvement additives, a tetrahydroxyethylethylenediamine and triisopropanolamine in combination with a polycarboxylate dispersant at a lower dosage than what was used in Table 1. For all of the concrete mixtures in the table, the polycarboxylate dispersant level was held constant at 0.1% by cement weight, and tributyl phosphate was added at 0.004% so that air contents would be less than 2%.

TABLE 2

| | Sample | | | | | | |
|---|---|---|---|---|---|---|---|
| | S-8 | S-9 | S-10 | S-11 | S-12 | S-13 | S-14 |
| Cement (lbs/yd$^3$) | 391 | 392 | 392 | 393 | 391 | 392 | 392 |
| Slag (lbs/yd$^3$) | 169 | 169 | 169 | 169 | 169 | 169 | 169 |
| Water (lbs/yd$^3$) | 280 | 280 | 280 | 281 | 280 | 281 | 280 |
| Sand (lbs/yd$^3$) | 1339 | 1342 | 1342 | 1344 | 1340 | 1343 | 1342 |
| Stone (lbs/yd$^3$) | 1891 | 1895 | 1895 | 1898 | 1893 | 1896 | 1895 |
| Water/Cement | 0.50 | 0.50 | 0.50 | 0.50 | 0.50 | 0.50 | 0.50 |
| Sand/Aggregate | 0.43 | 0.43 | 0.43 | 0.43 | 0.43 | 0.43 | 0.43 |
| PC Disp (% cwt) | 0.10 | 0.10 | 0.10 | 0.10 | 0.10 | 0.10 | 0.10 |
| Tetrahydroxyethylethylenediamine (% cwt) | — | 0.01 | 0.03 | 0.05 | — | — | — |
| Triisopropanol amine (% cwt) | — | — | — | — | 0.01 | 0.03 | 0.05 |
| TBP | 0.004 | 0.004 | 0.004 | 0.004 | 0.004 | 0.004 | 0.004 |
| Slump (in) | 7.75 | 8.00 | 8.00 | 8.25 | 7.00 | 8.25 | 8.75 |
| % Air | 2.0 | 1.8 | 1.8 | 1.6 | 1.9 | 1.7 | 1.8 |
| Initial Set (Hrs.) | 5.5 | 6.0 | 5.9 | 6.3 | 5.7 | 6.1 | 6.6 |
| Final Set (Hrs.) | 7.4 | 7.8 | 7.9 | 8.4 | 7.8 | 8.1 | 8.5 |
| Compressive Strength (psi) | | | | | | | |
| 1 day | 1120 | 1060 | 1020 | 970 | 1190 | 1040 | 920 |
| 7 day | 3800 | 3450 | 3560 | 3100 | 3630 | 3300 | 3280 |
| 28 day | 5870 | 6190 | 6720 | 6660 | 6940 | 5890 | 6180 |

PC Disp—polycarboxylate dispersant
TBP—tributyl phosphate

Table 2 demonstrates that in mixtures containing portland cement and pozzolan the samples containing polycarboxylate dispersant plus triisopropanolamine (S12 to S-14) or polycarboxylate dispersant plus tetrahydroxyethylethylenediamine (S-9 to S-11) had increased compressive strengths at 28 days over the sample containing polycarboxylate dispersant alone without any significant change in set time.

In Table 3 polycarboxylate dispersant was tested alone or in combination with tetrahydroxyethylethylenediamine or triisopropanolamine to determine if either of the strength improvement additives (amines) has an affect on very early strength development or slump retention.

TABLE 3

| Sample | S-15 | S-16 | S-17 |
|---|---|---|---|
| Cement (lbs/yd$^3$) | 603 | 601 | 604 |
| Water (lbs/yd$^3$) | 248 | 247 | 248 |
| Sand (lbs/yd$^3$) | 1377 | 1374 | 1379 |
| Stone (lbs/yd$^3$) | 1950 | 1946 | 1954 |

TABLE 3-continued

| Sample | S-15 | S-16 | S-17 |
|---|---|---|---|
| Water/Cement | 0.41 | 0.41 | 0.41 |
| Sand/Aggregate | 0.43 | 0.43 | 0.43 |
| PC Disp (% cwt) | 0.205 | 0.21 | 0.21 |

TABLE 3-continued

| Sample | S-15 | S-16 | S-17 |
|---|---|---|---|
| Triisopropanol amine (% cwt) | | | 0.044 |
| Tetrahydroxyethyl-ethylenediamine (% cwt) | — | 0.042 | |
| TBP (% cwt) | 0.0079 | 0.0042 | 0.0079 |
| Slump (in) | | | |
| 5 minutes | 8.50 | 8.50 | 8.75 |
| 10 minutes | 9.00 | 10.00 | 9.00 |
| 15 minutes | 8.25 | 8.75 | 8.25 |
| 20 minutes | 6.50 | 8.00 | 7.50 |
| Slump Loss: 5-20 min | 2.00 | 0.50 | 1.25 |
| % Air | | | |
| 5 minutes | 1.7 | 1.9 | 1.5 |
| 20 minutes | 1.8 | 2.4 | 1.8 |
| Initial Set (hrs) | 5.1 | 5.1 | 5.1 |
| Final Set (hrs) | 6.8 | 6.6 | 6.6 |
| Compressive Strength (psi) | | | |
| 12 hour | 1290 | 1750 | 1650 |
| 1 day | 3410 | 3860 | 3830 |
| 7 day | 7260 | 8310 | 8640 |
| 28 day | 8680 | 10200 | 10360 |

PC Disp - polycarboxylate dispersant
TBP - tributyl phosphate

The results in Table 3 showed that use of either tetrahydroxyethylethylenediamine (S-16) or triisopropanolamine (S-17) in the samples did not change initial set time when compared to the polycarboxylate only sample (S-15). Additionally, there was an increase in 12 hour compressive strength in the combination samples (S-16 and S-17) as compared to the polycarboxylate only sample. This was unexpected as the initial set time was not accelerated. The 1 day, 7 day and 28 day compressive strengths for the samples containing tetrahydroxyethylethylenediamine (S-16) or triisopropanolamine (S-17) were also increased as compared to the polycarboxylate only (S-15) sample.

Table 4 shows the comparison of two triisopropanolamine (TIPA) and dispersant combinations, namely triisopropanolamine and naphthalene sulfonate dispersant (BNS)S-25 and S-26, and triisopropanolamine and polycarboxylate dispersant (PC)S-22 and S-23, and their affect on the compressive strength development of cementitious compositions. The comparison was run at a fixed water content so water differences would not influence strength. The plain (S-18) and TIPA only (S-19 and S-20) mixes were mixed to a 2 inch slump and mixes containing PC or BNS were mixed to an 8 inch slump.

TABLE 4

| | Sample | | | | | | | | |
|---|---|---|---|---|---|---|---|---|---|
| | S-18 | S-19 | S-20 | S-21 | S-22 | S-23 | S-24 | S-25 | S-26 |
| Cement (lbs/yd$^3$) | 602 | 600 | 600 | 603 | 602 | 601 | 603 | 595 | 593 |
| Water (lbs/yd$^3$) | 291 | 290 | 290 | 292 | 291 | 291 | 292 | 288 | 287 |
| Sand (lbs/yd$^3$) | 1310 | 1306 | 1306 | 1312 | 1310 | 1308 | 1311 | 1294 | 1290 |
| Stone (lbs/yd$^3$) | 1882 | 1876 | 1876 | 1886 | 1882 | 1880 | 1884 | 1859 | 1853 |
| Water/Cement | 0.48 | 0.48 | 0.48 | 0.48 | 0.48 | 0.48 | 0.48 | 0.48 | 0.48 |
| Sand/Aggregate | 0.43 | 0.43 | 0.43 | 0.43 | 0.43 | 0.43 | 0.43 | 0.43 | 0.43 |
| Triisopropanolamine (% cwt) | — | 0.02 | 0.05 | — | 0.02 | 0.05 | — | 0.02 | 0.05 |
| PC Disp (% cwt) | — | — | — | 0.12 | 0.12 | 0.12 | — | — | — |
| BNS Disp (% cwt) | — | — | — | — | — | — | 0.36 | 0.36 | 0.36 |
| TBP (% cwt) | — | — | — | 0.005 | 0.005 | 0.005 | — | — | — |
| Concrete Slump (in) | 2.00 | 2.00 | 2.00 | 8.00 | 8.00 | 8.50 | 7.75 | 8.25 | 6.25 |
| % Air | 1.6 | 1.9 | 1.9 | 1.4 | 1.6 | 1.7 | 1.5 | 2.8 | 3.1 |
| Initial Set (Hrs.) | 4.6 | 4.8 | 5.0 | 6.2 | 6.2 | 6.2 | 6.1 | 6.1 | 5.7 |
| Final Set (Hrs.) | 6.2 | 6.6 | 6.7 | 7.8 | 7.7 | 7.7 | 7.7 | 7.5 | 7.1 |
| Compressive Strength (psi) | | | | | | | | | |
| 1 day | 2000 | 1890 | 1840 | 1880 | 2070 | 1890 | 1670 | 1810 | 1880 |
| 7 day | 5330 | 5190 | 5510 | 5340 | 6070 | 6210 | 5500 | 5730 | 6100 |
| 28 day | 6850 | 7350 | 7230 | 7070 | 8690 | 9000 | 7070 | 7580 | 7840 |

PC Disp—polycarboxylate dispersant
TBP—tributyl phosphate
BNS—naphthalene sulfonate formaldehyde condensate Table 4 shows that at 28 days the compressive strength development of the PC and TIPA containing samples (S-22 and S-23) was much greater than BNS and TIPA containing samples (S-25 and S-26) or samples containing TIPA (S-19 and S-20), PC(S-21), or BNS(S-24) alone.

Table 5 shows the comparison of tetrahydroxyethylethylenediamine (THEED) and dispersant combinations, namely THEED/napthalene sulfonate dispersant (BNS) and THEED/- polycarboxylate dispersant (PC) and their affect on the compressive strength development of cementitious compositions using three different cements. The dispersant comparison mixtures were run at a fixed water content so water differences would not influence strength. For all of the concrete mixtures in the table, BNS and polycarboxylate dispersant levels were selected to obtain 13.5% to 14.0% water reduction relative to the respective plain reference mixtures and tributyl phosphate was added at 0.01% to the polycarboxylate dispersant so that air contents would be less than 3.0%.

TABLE 5

| | Sample | | | | | | | | |
|---|---|---|---|---|---|---|---|---|---|
| | S-27 | S-28 | S-29 | S-30 | S-31 | S-32 | S-33 | S-34 | S-35 |
| Cement A (lbs/yd3) | 516 | 520 | 520 | | | | | | |
| Cement B (lbs/yd3) | | | | 515 | 509 | 508 | | | |
| Cement C (lbs/yd3) | | | | | | | 511 | 504 | 506 |
| Sand (lbs/yd3) | 1281 | 1317 | 1317 | 1333 | 1369 | 1368 | 1335 | 1366 | 1369 |
| Stone (lbs/yd3) | 1904 | 1960 | 1960 | 1834 | 1885 | 1883 | 1821 | 1864 | 1868 |
| Water (lbs/yd3) | 316 | 272 | 272 | 319 | 276 | 276 | 334 | 288 | 288 |
| % Water Reduction | | 13.9 | 13.9 | | 13.5 | 13.5 | | 13.8 | 13.8 |
| BNS (% cwt) | | 0.40 | | | 0.43 | | | 0.40 | |
| PC Disp (% cwt) | | | 0.11 | | | .011 | | | 0.11 |
| THEED (% cwt) | | 0.04 | 0.04 | | 0.03 | 0.03 | | 0.04 | 0.04 |
| TBP (% cwt) | | | 0.01 | | | 0.01 | | | 0.01 |
| Slump (in) | 5.75 | 5.00 | 6.25 | 6.00 | 5.00 | 5.00 | 7.00 | 7.00 | 3.75 |
| % Air | 1.4 | 2.0 | 2.2 | 1.9 | 2.7 | 2.8 | 1.5 | 2.7 | 2.5 |
| Initial Set (Hrs.) | 4.97 | 5.68 | 5.00 | 5.08 | 6.16 | 5.67 | 4.67 | 5.00 | 4.58 |
| Compressive Strength | | | | | | | | | |
| 1 Day | 1360 | 1970 | 1940 | 1310 | 1710 | 1850 | 2100 | 3080 | 3200 |
| 7 Day | 3480 | 4360 | 4820 | 3470 | 4680 | 5290 | 3930 | 4560 | 4870 |
| 28 Day | 4790 | 6130 | 6340 | 4930 | 6510 | 6930 | 4580 | 5780 | 6050 |

BNS—napthalene sulfonate
PC Disp—polycarboxylate dispersant
TBP—tributyl phosphate
THEED—tetrahydroxyethylethylenediamine Table 5 shows that the 28 day compressive strength development of the PC and THEED containing samples was greater than that of the BNS and THEED containing samples in each cement.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A strength improvement admixture composition for cementitious compositions comprising:
    a. polycarboxylate dispersant; and
    b. a strength improvement additive selected from the group consisting of poly(hydroxyalkylated)polyethylenepolyamines, poly(hydroxyalkylated)polyethyleneimines, 1,2-diaminopropane, polyglycoldiamine, poly(hydroxyalkyl)amines and mixtures thereof.

2. The admixture composition of claim 1, wherein the amount of polycarboxylate dispersant is from about 1% to about 99.99% and the strength improvement additive is from about 0.01% to about 99% based on the total dry weight of the admixture composition components.

3. The admixture composition of claim 1, wherein the amount of polycarboxylate dispersant is from about 40% to about 95% and the strength improvement additive is from about 5% to about 60% based on the total dry weight of the admixture composition components.

4. The admixture composition of claim 1, wherein the strength improvement additive is selected from the group consisting of di(hydroxyethyl)1,2-diaminopropane, tetra(hydroxyethyl)1,2-diaminopropane, ethoxylated polyglycoldiamine, triisopropanolamine and mixtures thereof.

5. The admixture composition of claim 1, wherein the strength improvement additive is selected from the group consisting of N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl)diethylenetriamine, N,N'-bis(2-hydroxypropyl)-N,N,N'-tri(hydroxyethyl)diethylenetriamine, and mixtures thereof.

6. The admixture composition of claim 1, wherein the strength improvement additive comprises poly(hydroxyethyl)polyethyleneimine.

7. The admixture composition of claim 1, wherein the strength improvement additive comprises at least one of the following:
    a) poly(hydroxyalkylated)polyethyleneamine having the following formula:

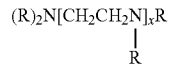

wherein x is 1,2 or 3 and R is selected from the group consisting of hydrogen, 2-hydroxyethyl, and 2-hydroxypropyl, each R can be the same or different, and at least 40% of the R groups are hydroxyalkyl, with no more than 40% of the R groups being hydroxypropyl;
    b) poly(hydroxyalkylated)polyamines having the following formula:

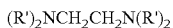

wherein R' is at least one of $(CH_2CH_2O)_yH$, $(CH_2CH(CH_3)O)_yH$ or $(CH(CH_3)CH_2O)_yH$ wherein y is 0, 1 or 2, and each R' can be the same or different;

c) 1,2-diaminopropane or polyglycoldiamine having the following formula:

$$(R'')_2N[XN]_y[CH_2CH_2N]_wR''$$
$$\quad\quad\quad\; |\quad\quad\quad\quad\;\; |$$
$$\quad\quad\quad\; R''\quad\quad\quad\quad R''$$

wherein R" can be the same or different and is selected from the group consisting of $(CH_2CH_2O)_yH$, $(CH_2CH(CH_3)O)_yH$, and $(CH(CH_3)CH_2O)_yH$;

wherein X is a covalent bond or a divalent organic radical selected from the group consisting of $CH_2$, $CH_2CH_2$,

CH3
|
CHCH2 and $CH_2CH_2CH_2OCH_2CH_2OCH_2CH_2OCH_2CH_2CH_2$;

wherein y and v are 0, 1 or 2;

wherein w is 0 or 1;

wherein v and w cannot both be 0;

d) Ethoxylated Amine HH, having a typical analysis of:

HN⟨piperazine ring⟩N—CH₂CH₂NH₂— aminoethyl piperazine: 50% to 70% by weight
triethylene tetramine: 40% maximum by weight
others: balance; or e) poly(hydroxyalkyl)amines having the following formula:

$(R^3)_nH_qN$

Wherein $R^3$ is $[(CHR^4)_m(CHR^4)O]_qH$;
wherein $R^4$ is independently H or $CH_3$;
wherein m =1 or 2;
wherein n =2 or 3;
wherein p =1 or 2;
wherein q =3-n;
and each $R^3$ can be the same or different.

8. The admixture composition of claim 1 further comprising at least one of set retarders, set accelerators, air detraining agents, air entraining agents, shrinkage reducing admixtures, water reducers, foaming agents, dampproofing admixtures, pumping aids, fungicidal admixtures, insecticidal admixtures, germicidal admixtures, alkali activity reducers, bonding admixtures, corrosion inhibitors, or pigments.

9. The composition of claim 1 wherein the polycarboxylate dispersant comprises at least one of dispersant formulas a) through j):

a) a dispersant of Formula (I):

$$-(NH-\underset{(CH_2)_m}{\overset{COOX}{\underset{|}{CH}}}-(CH_2)_n-\underset{O}{\overset{\|}{C}})_a-(NH-\underset{(CH_2)_{m'}}{\overset{\overset{O}{\|}}{\underset{|}{C}}-Q-(R)_pR_1}{CH}-(CH_2)_{n'}-\underset{O}{\overset{\|}{C}})_b-(NH-\underset{(CH_2)_{m''}}{\overset{\overset{O}{\|}}{\underset{|}{C}}-Q-Y}{CH}-(CH_2)_{n''}-\underset{O}{\overset{\|}{C}})_z-(Z)_d$$

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

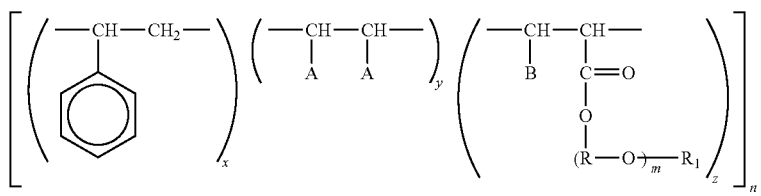

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;
c) a dispersant comprising at least one polymer or a salt thereof having the form of a copolymer of
  i) a maleic anhydride half-ester with a compound of the formula RO(AO)$_m$H, wherein R is a $C_1$-$C_{20}$ alkyl group, A is a $C_{2-4}$ alkylene group, and m is an integer from 2-16; and
  ii) a monomer having the formula $CH_2=CHCH_2$-(OA)$_n$OR, wherein n is an integer from 1-90 and R is a $C_{1-20}$ alkyl group;
d) a dispersant obtained by copolymerizing 5 to 98% by weight of an (alkoxy)polyalkylene glycol mono(meth)acrylic ester monomer (a) represented by the following general formula (1):

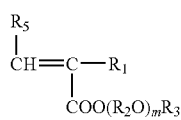

(1)

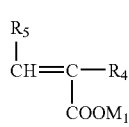

(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 2 to 95% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;
e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;
f) a dispersant of Formula (III):

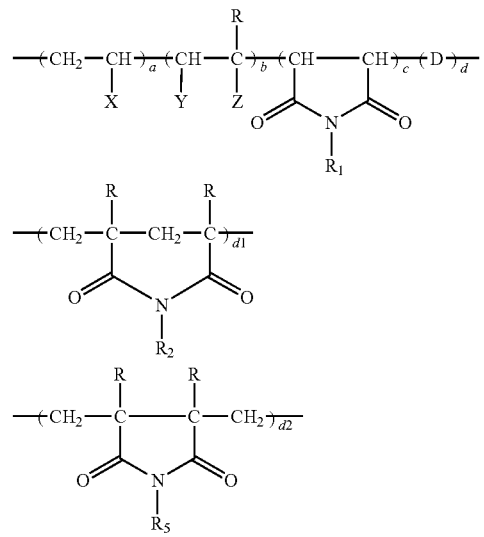

wherein in Formula (III):
D=a component selected from the group consisting of the structure d1, the structure d2, and mixtures thereof;
X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —O(CH$_2$)$_n$OR$_3$ where n=2 to 6, —COOR$_3$, or —(CH$_2$)$_n$OR$_3$ where n =0 to 6, —CONHR$_3$, —CONHC(CH$_3$)$_2$ CH$_2$SO$_3$M, —COO(CHR$_4$)$_n$OH where n=2 to 6, or —O(CH$_2$)$_n$OR$_4$ wherein n =2 to 6;
$R_1$, $R_2$, $R_3$, $R_5$ are each independently —(CHRCH$_2$O)$_m$R$_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$ =H, Methyl, $C_2$ to about $C_6$ Alkyl, or about $C_6$ to about $C_{10}$ aryl;
M =H, Alkali Metal, Alkaline Earth Metal, Ammonium, Amine, triethanol amine, Methyl, or $C_2$ to about $C_6$ Alkyl;

a=0 to about 0.8;
b =about 0.2 to about 1.0;
c =0 to about 0.5;
d =0 to about 0.5;
wherein a, b, c, and d represent the mole fraction of each unit and the sum of a, b, c, and d is 1.0;
wherein a can represent 2 or more differing units in the same dispersant structure;
wherein b can represent 2 or more differing units in the same dispersant structure;
wherein c can represent 2 or more differing units in the same dispersant structure; and
wherein d can represent 2 or more differing units in the same dispersant structure;

g) a dispersant of Formula (IV):

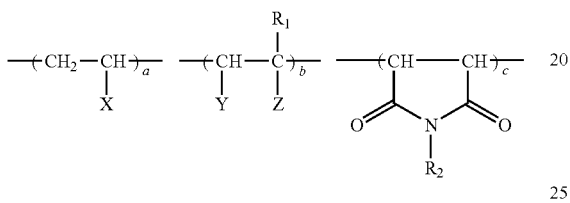

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X =H, $CH_3$, $C_2$ to $C_6$ Alkyl, Phenyl, p-Methyl Phenyl, p-Ethyl Phenyl, Carboxylated Phenyl, or Sulfonated Phenyl;

Y =H, —COOM, —COOH, or W;

W =a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z =H, —COOM, —$O(CH_2)_nOR_3$ where n=2 to 6, —CO-$OR_S$, —$(CH_2)_nOR_3$ where n =0 to 6, or —$CONHR_3$;

$R_1$ =H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$ =H, Methyl, or $C_2$ to $C_8$ Alkyl;

$R_5$ =$C_1$ to $C_{18}$ alkyl or $C_6$ to $C_{18}$ alkyl aryl;

M =Alkali Metal, Alkaline Earth Metal, Ammonia, Amine, monoethanol amine, diethanol amine, triethanol amine, morpholine, imidazole;

a =0.01-0.8;
b =0.2-0.99;
c =0-0.5;
wherein a, b, c represent the mole fraction of each unit and the sum of a, b, and c, is 1;
wherein a can represent 2 or more differing units in the same dispersant structure;
wherein b can represent 2 or more differing units in the same dispersant structure; and
wherein c can represent 2 or more differing units in the same dispersant structure;

h) a random copolymer corresponding to the following Formula (V) in free acid or salt form having the following monomer units and numbers of monomer units:

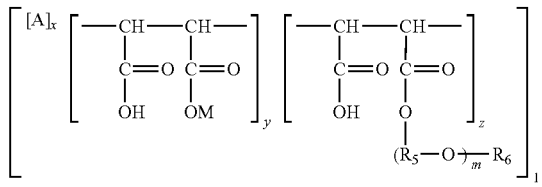

wherein A is selected from the moieties (i) or (ii)

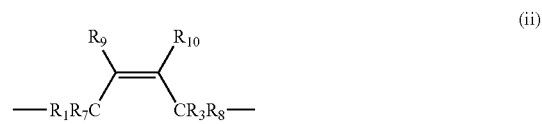

(i) —$CR_1R_2$—$CR_3R_4$— wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-29}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated mono and/or dicarboxylic acids, comprising:

i) 0 to 90 mol % of at least one component of the formula 3a or 3b:

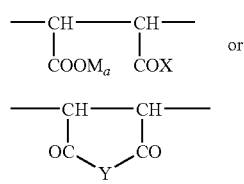

wherein M is a hydrogen atom, a mono- or divalent metal cation, an ammonium ion or an organic amine residue, a is 1, or when M is a divalent metal cation a is ½;

wherein X is $-OM_a$,
  $-O-(C_mH_{2m}O)_n-R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
  $-NHR_2$, $-N(R^2)_2$ or mixtures thereof in which $R^2=R^1$ or $-CO-NH_2$; and wherein Y is an oxygen atom or $-NR^2$;

ii) 1 to 89 mol% of components of the general formula 4:

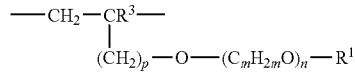

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is independently 2 to 4, and n is 0 to 100, and iii) 0 to 10 mol % of at least one component of the formula 5a or 5b:

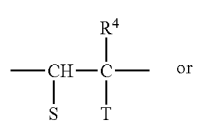

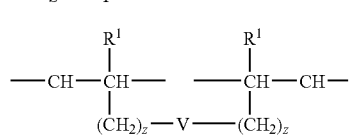

wherein S is a hydrogen atom or $-COOM_a$ or $-COOR_5$, T is $-COOR_5$, $-W-R_7$, $-CO-[-NH-(CH2)3)-]_s-W-R_7$, $-CO-O-(CH_2)_z-W-R_7$, a radical of the general formula:

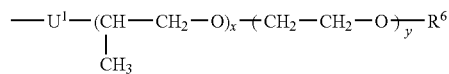

or $-(CH_2)_z-V-(CH_2)_z-CH=CH-R_1$, or when S is $-COOR_5$ or $-COOM_a$, $U_1$ is $-CO-NHM-$, $-O-$ or $-CH_2O$, $U_2$ is $-NH-CO-$, $-O-$ or $-OCH_2$, V is $-O-CO-C_6H_4-CO-O-$ or $-W-$, and W is

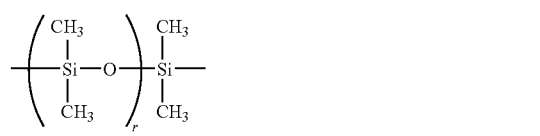

$R_4$ is a hydrogen atom or a methyl radical, $R_5$ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

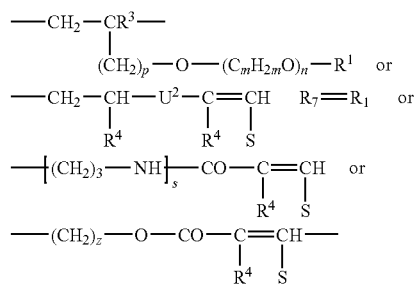

r is 2 to 100, s is 1 or 2, x is 1 to 150, y is 0 to 15 and z is 0 to 4;

iv) 0 to 90 mol % of at least one component of the formula 6a, 6b, or 6c:

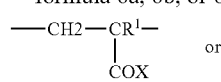

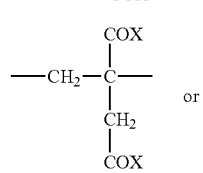

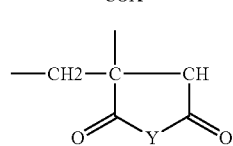

wherein M is a hydrogen atom, a mono- or divalent metal cation, an ammonium ion or an organic amine residue, a is 1, or when M is a divalent metal cation a is ½;

wherein X is $-OM_a$,
  $-O-(C_mH_{2m}O)_n-R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —NH—$(C_mH_{2m}O)_n$—$R^1$, —$NHR_2$, —$N(R^2)_2$ or mixtures thereof in which $R^2=R^1$ or —CO—$NH_2$; and wherein Y is an oxygen atom or —$NR^2$;

j) a copolymer of dicarboxylic acid derivatives and oxyalkylene glycol-alkenyl ethers, comprising:

i) 1 to 90 mol.% of at least one member selected from the group consisting of structural units of formula 7a and formula 7b:

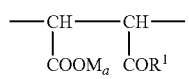
(7a)

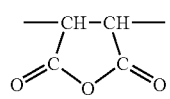
(7b)

wherein M is H, a monovalent metal cation, a divalent metal cation, an ammonium ion or an organic amine;

a is ½ when M is a divalent metal cation or 1 when M is a monovalent metal cation;

wherein $R^1$ is —$OM_a$, or

—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

m is 2 to 4;

n is 1 to 200;

ii) 0.5 to 80 mol.% of the structural units of formula 8:

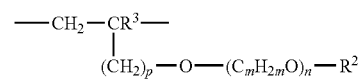
(8)

wherein $R^3$ is H or a $C_{1-5}$ aliphatic hydrocarbon;

p is 0 to 3;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

m is 2 to 4;

n is 1 to 200;

iii) 0.5 to 80 mol.% structural units selected from the group consisting of formula 9a and formula 9b:

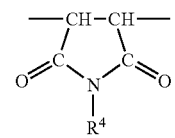
(9a)

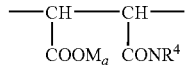
(9b)

wherein $R^4$ is H, $C_{1-20}$ aliphatic hydrocarbon that is optionally substituted with at least one hydroxyl group, —$(C_mH_{2m}O)$—$R^2$, —CO—NH—$R^2$, $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

m is 2 to 4;

n is 1 to 200;

iv) 1 to 90 mol.% of structural units of formula 10

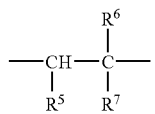
(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of —$COOM_a$, —$(SO_3)M_a$, and —$(PO_3)M_{a2}$, a $C_{5-8}$ cycloaliphatic hydrocarbon, —$OCOR^4$, —$OR^4$, and —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of —$COOM_a$, —$(SO_3)M_a$, and —$(PO_3)M_{a2}$.

10. A strength improvement admixture composition for cementitious compositions consisting essentially of:

a. polycarboxylate dispersant; and b. a strength improvement additive selected from the group consisting of poly(hydroxyalkylated)polyethyleneamines, poly(hydroxyalkylated)polyethylenepolyamines, poly(hydroxyalkylated)polyethyleneimines, poly(hydroxyalkylated)polyamines, 1,2-diaminopropane, polyglycoldiamine, poly(hydroxyalkyl)amines and mixtures thereof, wherein the amount of polycarboxylate dispersant is from about 40% to about 95% and the strength improvement additive is from about 5% to about 60% based on the total dry weight of the admixture composition components.

11. The admixture composition of claim 10, wherein the strength improvement additive is selected from the group consisting of di(hydroxyethyl)1,2-diaminopropane, tetra(hydroxyethyl)1,2-diaminopropane, ethoxylated polyglycoldiamine, triisopropanolamine and mixtures thereof.

12. The admixture composition of claim 10, wherein the strength improvement additive is selected from the group consisting of N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl)diethylenetriamine, N,N'-bis(2-hydroxypropyl)-N,N,N'-tri(hydroxyethyl)diethylenetriamine, and mixtures thereof.

13. The admixture composition of claim 10, wherein the strength improvement additive comprises poly(hydroxyethyl)polyethyleneimine.

14. A strength improvement admixture composition for cementitious compositions consisting essentially of:
   a. polycarboxylate dispersant; and
   b. a strength improvement additive selected from the group consisting of poly(hydroxyalkylated)polyethyleneamines, poly(hydroxyalkylated)polyethylenepolyamines, poly(hydroxyalkylated)polyethyleneimines, poly(hydroxyalkylated)polyamines, 1,2-diaminopropane, polyglycoldiamine, poly(hydroxyalkyl)amines and mixtures thereof;
   wherein the amount of poly(hydroxyalkyl)amines is greater than 5% based on the total dry weight of the polycarboxylate dispersant and strength improvement additive.

15. The admixture composition of claim 14, wherein the amount of polycarboxylate dispersant is from about 1% to about 99.99% and the strength improvement additive is from about 0.01% to about 99% based on the total dry weight of the admixture composition components.

16. The admixture composition of claim 14, wherein the amount of polycarboxylate dispersant is from about 40% to about 95% and the strength improvement additive is from about 5% to about 60% based on the total dry weight of the admixture composition components.

17. The admixture composition of claim 14, wherein the strength improvement additive is selected from the group consisting of di(hydroxyethyl)1,2-diaminopropane, tetra(hydroxyethyl)1,2-diaminopropane, ethoxylated polyglycoldiamine, triisopropanolamine and mixtures thereof.

18. The admixture composition of claim 14, wherein the strength improvement additive is selected from the group consisting of N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl)diethylenetriamine, N,N'-bis(2-hydroxypropyl)-N,N,N'-tri(hydroxyethyl)diethylenetriamine, and mixtures thereof.

* * * * *